United States Patent
Bauco

(10) Patent No.: US 11,624,876 B2
(45) Date of Patent: Apr. 11, 2023

(54) FIBER OPTIC CABLE ASSEMBLY HAVING A CONNECTOR WITH A HOLOGRAPHIC OPTICAL ELEMENT AND METHOD OF MAKING SAME

(71) Applicant: CORNING RESEARCH & DEVELOPMENT CORPORATION, Corning, NY (US)

(72) Inventor: Anthony Sebastian Bauco, Horseheads, NY (US)

(73) Assignee: Corning Research & Development Corporation, Corning, NY (US)

(*) Notice: Subject to any disclaimer, the term of this patent is extended or adjusted under 35 U.S.C. 154(b) by 0 days.

(21) Appl. No.: 17/355,784

(22) Filed: Jun. 23, 2021

(65) Prior Publication Data

US 2022/0003941 A1 Jan. 6, 2022

Related U.S. Application Data

(60) Provisional application No. 63/046,847, filed on Jul. 1, 2020.

(51) Int. Cl.
  *G02B 6/38* (2006.01)
(52) U.S. Cl.
  CPC ......... *G02B 6/3853* (2013.01); *G02B 6/3825* (2013.01); *G02B 6/3873* (2013.01)
(58) Field of Classification Search
  None
  See application file for complete search history.

(56) References Cited

U.S. PATENT DOCUMENTS

| | | | | |
|---|---|---|---|---|
| 5,202,775 A | * | 4/1993 | Feldman | G03H 1/08 |
| | | | | 359/9 |
| 5,420,953 A | * | 5/1995 | Boudreau | G02B 6/4249 |
| | | | | 385/33 |
| 6,012,852 A | | 1/2000 | Kadar-Kallen et al. | |
| 6,304,694 B1 | * | 10/2001 | Ford | G02B 6/32 |
| | | | | 385/35 |

(Continued)

FOREIGN PATENT DOCUMENTS

| | | |
|---|---|---|
| CN | 104040402 A | 9/2014 |
| WO | 98/14813 A1 | 4/1998 |

OTHER PUBLICATIONS

"Bayfol® HX—Holographic Light Guiding Full-Color hologram recording film", Available at: https://solutions.covestro.com/-/media/covestro/solution-center/brands/downloads/imported/1571231855.pdf, 2020, 2 pages.

*Primary Examiner* — Rhonda S Peace
(74) *Attorney, Agent, or Firm* — Adam R. Weeks

(57) ABSTRACT

A method of making a fiber optic cable assembly having a fiber optic cable terminated by at least one connector is disclosed. The at least one connector includes a ferrule with a holographic optical element and the fiber optic cable includes at least one optical fiber. The method includes securing the at least one optical fiber to the ferrule and exposing the holographic optical element to light from the at least one optical fiber to write an interference pattern into the holographic optical element corresponding to the at least one optical fiber. A fiber optic cable assembly made according to the method is disclosed and an apparatus for carrying out the method is also disclosed.

8 Claims, 9 Drawing Sheets

(56) References Cited

U.S. PATENT DOCUMENTS

| | | | |
|---|---|---|---|
| 7,505,650 B1 * | 3/2009 | Grzybowski | C03B 23/02 65/106 |
| 8,061,904 B1 | 11/2011 | Greenberg et al. | |
| 9,618,705 B2 * | 4/2017 | Sasaki | G02B 6/3885 |
| 2012/0020619 A1 * | 1/2012 | Kadar-Kallen | G02B 6/32 385/74 |
| 2015/0369991 A1 * | 12/2015 | Bauco | G02B 6/0008 362/555 |
| 2022/0003941 A1 * | 1/2022 | Bauco | G02B 6/3825 |

* cited by examiner

FIBER OPTIC CABLE ASSEMBLY HAVING A CONNECTOR WITH A HOLOGRAPHIC OPTICAL ELEMENT AND METHOD OF MAKING SAME

PRIORITY APPLICATION

This application claims the benefit of priority of U.S. Provisional Application No. 63/046,847, filed on Jul. 1, 2020, the content of which is relied upon and incorporated herein by reference in its entirety.

TECHNICAL FIELD

This disclosure relates generally to optical connectivity, and more particularly to a connector for a fiber optic cable assembly having a holographic optical element to provide self-alignment properties to optical fibers that are terminated by the connector. The disclosure also relates to an apparatus and method for forming the holographic optical element of the fiber optic connector.

BACKGROUND

The speed and bandwidth of information-carrying signals over fiber optic cables makes optical fiber communication appealing in many applications. For example, optical fiber communication is useful in a wide variety of applications, including the telecommunication industry for voice, video and data transmission. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. Optical fiber connectors are a type of optical interface device used to optically join optical fiber cables where connect and disconnect capability may be required.

A fiber optic connector typically includes a ferrule with one or more bores that receive one or more optical fibers held within a housing. A housing that surrounds at least a portion of the ferrule defines features for mechanically retaining the fiber optic connector with another component (e.g. an adapter). The adapter or ferrule itself may include features for aligning the ferrule with a mating ferrule (e.g., from another fiber optic connector). Thus, when the housing of the fiber optic connector is mated with another component (e.g., an adapter), the optical fiber(s) in the ferrule can be held in alignment with the optical fiber(s) of the mating ferrule to establish an optical connection.

The amount of data and other information transmitted over fiber optic networks has dramatically increased, and the need for high fiber count, high density optical connectors has similarly developed. Most traditional fiber optic connectors rely on physical contact between the ends of fibers to establish an interconnection, but there are inherent challenges with such an approach for high fiber count, high density optical connectors. For example, in traditional multi-fiber connectors, precise alignment of the abutting optical fibers is critical for providing a low-loss (high coupling efficiency) interconnection. A small angular or lateral misalignment between the confronting fiber ends can be detrimental to the coupling efficiency. As the number of optical fibers in the connector increases, the ability to maintain axially and angularly aligned physical contact becomes increasingly difficult. Another challenge inherent to physical contact connectors is that such connectors are sensitive to contamination. For example, the size of airborne dust is known to range from sub-microns to tens of microns, which is comparable to the core diameter of both single-mode and multi-mode fibers. In addition, dirt and debris can fully truncate the optical path between connected fibers. Consequently, data transmission between connectors that employ physical contact between the optical fibers can easily be degraded due to contamination on the surfaces. For these reasons, many current physical contact, multi-fiber connectors only include optical fibers arranged in a single row (i.e., one-dimensional arrangement) or two rows, and are limited to relatively few optical fibers (e.g., twelve fibers or less) per row.

To address many of the challenges of physical contact connectors, lensed fiber optic connectors have been developed. Lensed connectors place respective micro lenses adjacent the ends of the optical fibers. When one lensed connector is mated to another lensed connector, the light beam from any given optical fiber (e.g., the launch fiber) in the first connector is expanded and collimated by its associated micro lens, transmitted through an airgap or other void of the interconnection, and then focused by the micro lens associated with a corresponding optical fiber (e.g., the receive fiber) in the second connector. Thus, the micro lenses not only obviate the need for physical contact between the end faces of the optical fibers, but also expand (e.g., increased beam diameter) and collimate the light beam across the interconnection. The expanded, collimated light beam decreases the sensitivity of the interconnection to airborne dust and other debris and minimizes attenuation due to beam divergence.

While lensed connectors may be suitable for some applications, they present their own challenges for use as high fiber count, high density optical connectors. For example, precise alignment is required between the ends of the optical fibers and the lenses associated with each of the fiber ends. Typically a ferrule includes a two-dimensional array of bores for receiving the optical fibers and defines or supports the lenses at a fixed distance from ends of the optical fibers. Due to manufacturing tolerances and other factors, the bores of the ferrule and/or the lenses may include spacing variations (referred to as pitch variations) between in both directions of the array (e.g., in an x-direction along the rows and in a y-direction along the columns, the z-direction being parallel to the axes of the optical fibers).

Deviations in the fiber-to-lens alignment will result in angular errors in the collimated beam exiting the lenses, resulting in high losses for the interconnection. Thus, to provide a low-loss connection, the pitch of the fiber array should precisely match the pitch of the lens array. However, it is very expensive and time-consuming to ensure a precise alignment between the fiber array and the lens array. There must be precise manufacturing of the alignment features of the ferrule that establish the positions in the fiber array, precise manufacturing of the lenses that establish the positions in the lens array, and precise alignment between the two arrays axially (focal position), laterally, and angularly. This can be especially challenging for two-dimensional arrays with a large number of optical fibers, and especially challenging for arrays involving single mode optical fibers. Compared to multimode optical fibers, single mode optical fibers have a much smaller core, which makes alignment to a respective lens even more difficult. Factors such as these have hindered the use and implementation of high fiber count lensed connectors, and particularly single mode lensed connectors, in fiber optic networks. Accordingly, there remains a need to advance the development of high fiber count, high-density optical connectors.

SUMMARY

A method of making a fiber optic cable assembly having a fiber optic cable terminated by at least one connector is disclosed. The at least one connector includes a ferrule with a holographic optical element and the fiber optic cable includes a plurality of optical fibers terminated by the at least one connector. The method includes securing the plurality of optical fibers to the ferrule to fix relative positions of ends of the plurality of optical fibers and the holographic optical element, wherein the ends of the plurality of optical fibers arranged in a fiber array. With the plurality of optical fibers secured to the ferrule, the method further comprises exposing the holographic optical element to light from the plurality of optical fibers to write an array of interference patterns into the holographic optical element corresponding to the fiber array.

In an exemplary embodiment, the ferrule includes a plurality of micro-bores. Securing the plurality of optical fibers in such an embodiment may further comprise: inserting each of the plurality of optical fibers into a respective micro-bore in the ferrule; positioning each of the ends of the plurality of optical fibers along a common plane; and securing each of the plurality of optical fibers to the ferrule after said positioning.

In some example embodiments of the method, exposing the holographic optical element may further include: energizing a laser to generate a laser beam; splitting the laser beam into an object beam and a reference beam; directing the object beam into the plurality of optical fibers such that the light from the ends of the plurality of optical fibers projects onto a first surface of the holographic optical element; and directing the reference beam to project onto a second surface of the holographic optical element that is spaced from and opposite to the first surface. The interaction between the object beam and the reference beam at the holographic optical element creates the array of interference patterns corresponding to the fiber array.

Once exposed to the light from the laser, the holographic optical element may be developed. In one embodiment, the development of the holographic optical element may be done without removing the holographic optical element from the ferrule. In an alternative embodiment, however, the method may further include removing the holographic optical element from the ferrule; developing the holographic optical element; and reconnecting the holographic optical element to the ferrule. In the event that the connector is not completely assembled during the writing of the holographic optical element, the method may further include positioning the ferrule within a housing of the connector.

While methods like those summarized above form some aspects of this disclosure, other aspects pertain to fiber optic cable assemblies themselves. In one exemplary embodiment, a fiber optic cable assembly comprises a fiber optic cable that includes a plurality of optical fibers having ends arranged in a fiber array. The fiber optic cable assembly also comprises at least one fiber optic connector terminating the plurality of optical fibers. The at least one fiber optic connector includes a ferrule to which the plurality of optical fibers are secured. The ferrule has a holographic optical element with an array of interference patterns corresponding to the fiber array due to being written in the holographic optical element through in-situ exposure.

In an exemplary embodiment, the ferrule may include an array of micro-bores, such as a two-dimensional array, wherein each micro-bore receives a respective one of the plurality of optical fibers, and wherein the ends of the plurality of optical fibers are positioned along a common plane.

An apparatus for making a fiber optic cable assembly having a fiber optic cable terminated by at least one connector is also disclosed. The at least one connector includes a ferrule with a holographic optical element and the fiber optic cable includes at least one optical fiber secured to the ferrule. In one example embodiment, the apparatus includes: a laser for generating a laser beam; a first beam splitter for splitting the laser beam into an object beam and a reference beam, wherein the object beam is configured to be directed into the at least one optical fiber; an arrangement of reflective lenses for redirecting the reference beam from the first beam splitter; and a holder for holding the fiber optic cable assembly in the apparatus relative to the reflective lenses such that the reference beam is configured to project onto the holographic optical element when being held by the holder. In an exemplary embodiment, the fiber optic cable includes a plurality of optical fibers terminated by the at least one connector, and the apparatus further includes a second beam splitter configured to split the object beam such that each of the plurality of optical fibers of the fiber optic cable carries the object beam.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
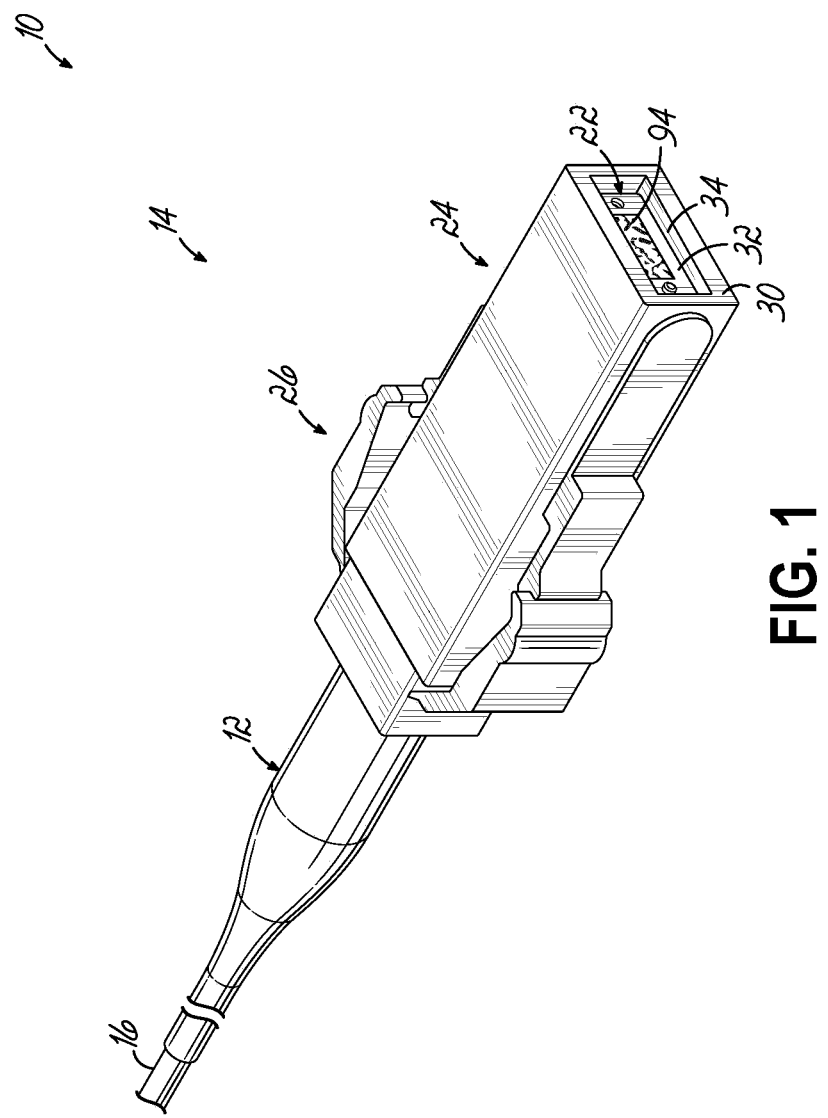
FIG. 1 is a perspective view of a fiber optic cable assembly having a connector in accordance with an embodiment of the disclosure.
Figure 2:
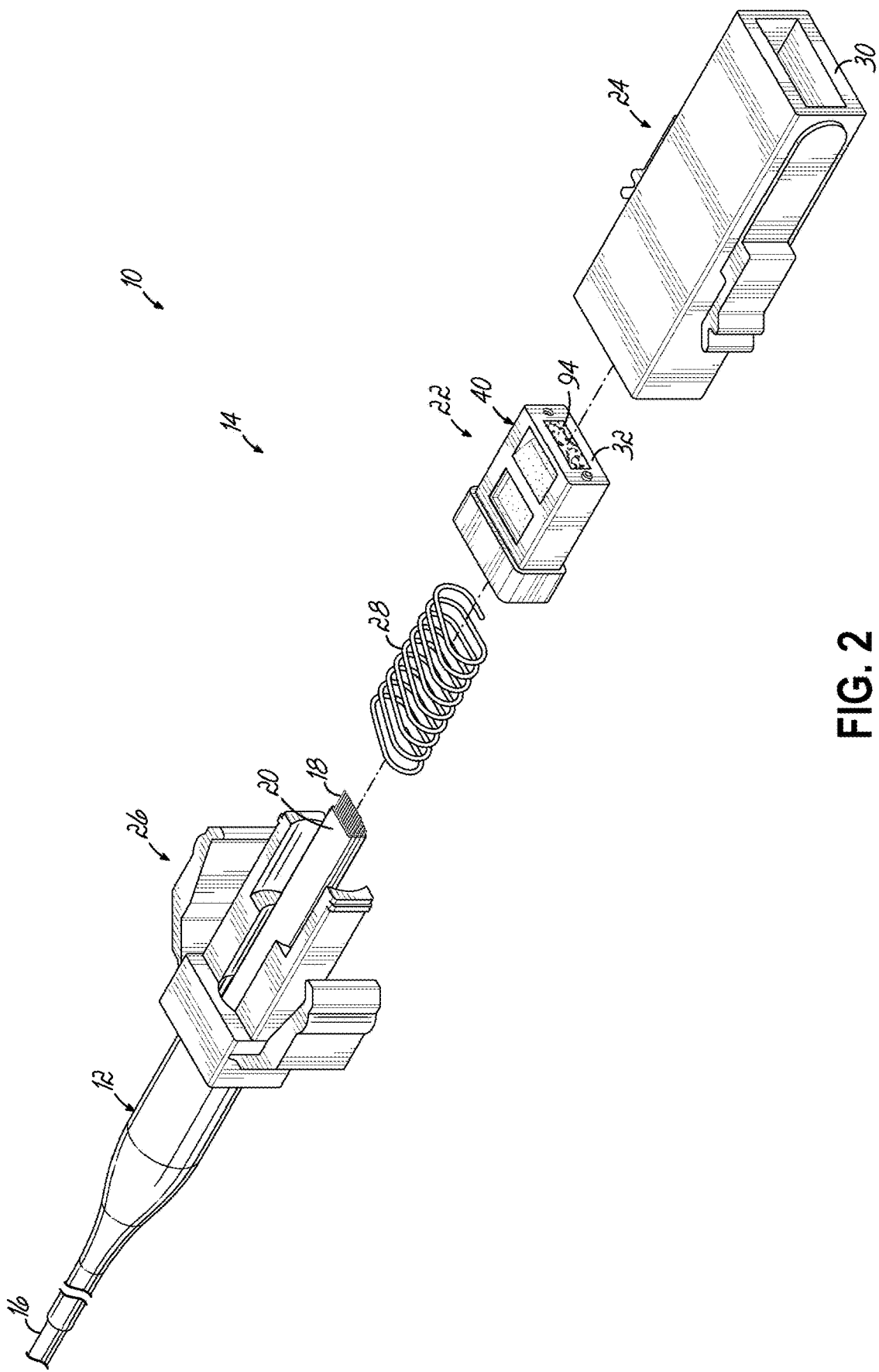
FIG. 2 is a disassembled view of the fiber optic cable assembly illustrated in FIG. 1.

Referring to FIGS. 1 and 2, an exemplary fiber optic cable assembly 10 includes a fiber optic cable 12 and a fiber optic connector 14 (also referred to as "optical connector", or simply "connector"). Although the connector 14 is shown as having the form factor of a MXC® connector (available from US Conec, Ltd., of Hickory, N.C., USA), the features described below may be applicable to different connector designs. This includes single-fiber or multi-fiber connector designs. Similarly, the illustrated cable 12 is merely an example to facilitate discussion, and persons skilled in optical connectivity will appreciate how different cable designs may be terminated with the connector 14 to provide different fiber optic cable assemblies. While the fiber optic cable assembly 10 is illustrated as including one connector 14, it should be realized that the fiber optic cable 12 may include a large number of optical fibers and be terminated by multiple connectors 14. Thus, aspects of the present disclosure are not limited to the particular cable 12 and connector 14 shown and described herein.

As will be described in more detail below, the fiber optic connector 14 is configured as a "lensed" connector having an optical element configured to expand and collimate the light beam from the optical fibers of the cable 12 for transmission across an optical joint, such as between two mated connectors or between a connector and other optic component. In an exemplary embodiment of the disclosure, the optical element in the connector 14 is a holographic optical element. The use of holography to form the optical element overcomes many of the challenges of other lensed fiber optic connectors described above. More particularly, the use of holography provides a self-aligned arrangement between the optical fibers and the optical element in the connector 14. Consequently, the time-consuming and costly process of providing a precise alignment between the fiber array and the lens array (i.e., for a multi-fiber lensed connector) is no longer required for producing low-loss optical connections using non-physical contact connectors.

As best shown in FIG. 2, the illustrated fiber optic cable 12 includes an outer jacket 16 that surrounds and protects a plurality of optical fibers 18. In one embodiment of the disclosure, the optical fibers 18 may be configured as a plurality of ribbons 20 each carrying a plurality of optical fibers 18 (e.g., 12, 16 or 24 optical fibers) arranged in a side-by-side manner. Such ribbons 20 are generally well known in the art and thus will not be described further herein. It should be appreciated that the plurality of optical fibers 18 are not limited to an arrangement of ribbons but may be presented in alternative forms and remain within the scope of the disclosure.

In an exemplary embodiment, the connector 14 includes a ferrule 22 configured to support the plurality of optical fibers 18, a housing 24 (also referred to as "front body 24") having a cavity in which the ferrule 22 is received, and a connector retention body 26 configured to support the fiber optic cable 12 and retain the ferrule 22 within the housing 24. The ferrule 22 may be biased to a forward position within the housing 24 by a spring 28. The housing 24 and the connector retention body 26 may be coupled together, such as through a snap fit or the like, to capture the ferrule 22 within the housing 24. When the connector 14 is assembled as shown in FIG. 1, a front end 30 of the housing 24 may project beyond a front end 32 of the ferrule 22 to define a cavity 34. As mentioned above and discussed in more detail below, the connector 14 is configured as an expanded beam connector providing expanded light beams from the optical fibers 18 that travel across a void space or region when two connectors are mated together. The construction and interoperability between the various parts of connector 14 are generally known to persons of ordinary skill in optical connectivity and thus will not described further herein. It should be understood that aspects of the disclosure are not limited to the particular shape, size, and configuration of the ferrule or housing shown and described herein but are applicable to a wide range of ferrule and housing configurations.

Figure 3:
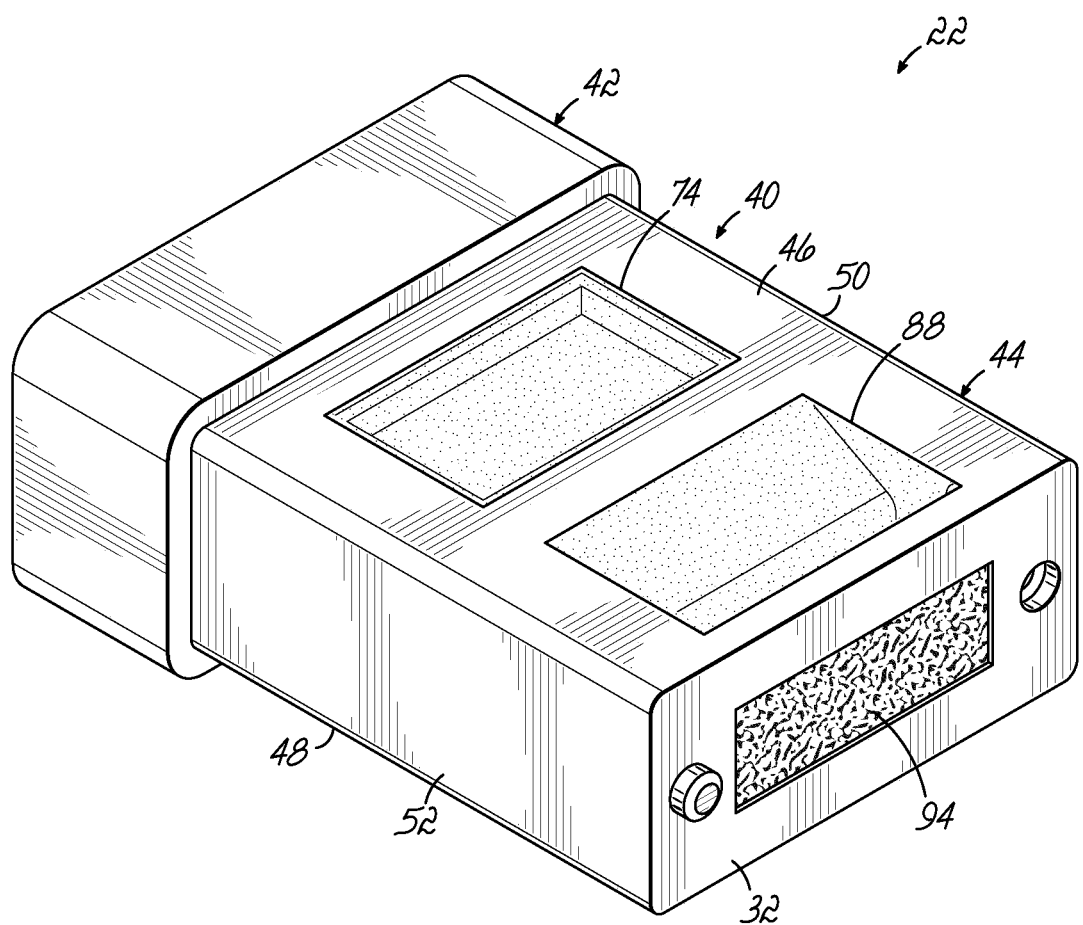
FIG. 3 is a perspective view of a ferrule of the fiber optic connector assembly shown in FIG. 1.
Figure 4:
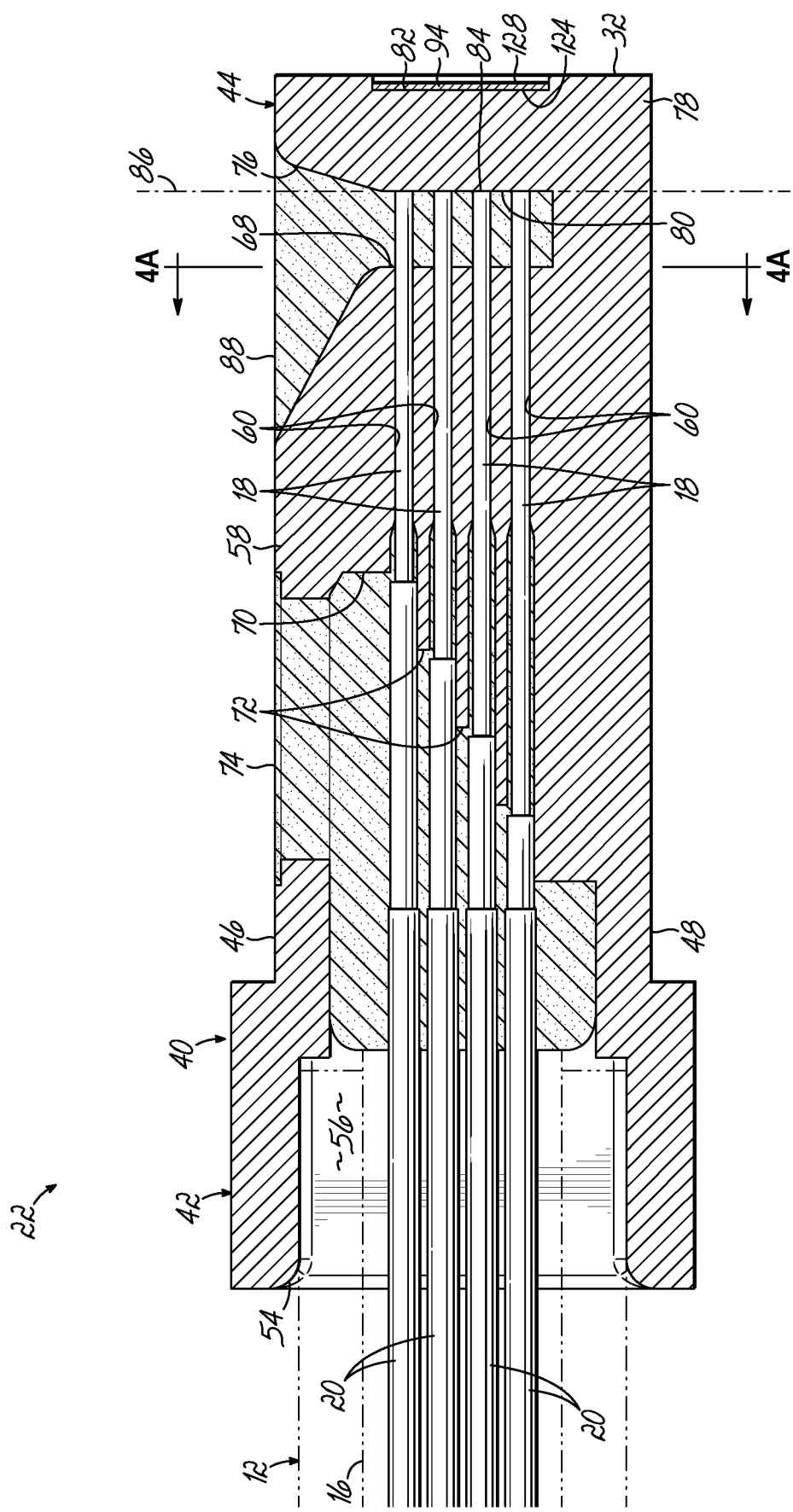
FIG. 4 is a cross-sectional view of the ferrule illustrated in FIG. 3.

FIGS. 3 and 4 illustrate a ferrule 22 in accordance with an exemplary embodiment of the disclosure. The ferrule 22 includes a generally rectangular body 40 having a rear portion 42, a front portion 44, a top wall 46, bottom wall 48, and generally parallel side walls 50, 52. It should be recognized that while the ferrule 22 is described as having a generally rectangular configuration, aspects of the invention are not limited to such an arrangement. More particularly, as noted above, the ferrule 22 may have a wide range of shapes and sizes and remain within the scope of the present disclosure. The terms "rear" and "forward" refer to positions relative to the main fiber optic cable 12, with "rear" being located closer to the main fiber optic cable 12 than "forward". The rear portion 42 of the ferrule 22 includes an opening 54 for accessing a first internal cavity 56 of the ferrule 22. The first internal cavity 56 is configured to receive the optical fibers 18 from the ribbons 20 carried by the fiber optic cable 12. The forward end of the cavity 56 is closed off by an intermediate wall 58 that defines a plurality of micro-bores 60 each configured to receive a respective optical fiber 18 from the ribbons 20 of the fiber optic cable 12.

Figure 4A:
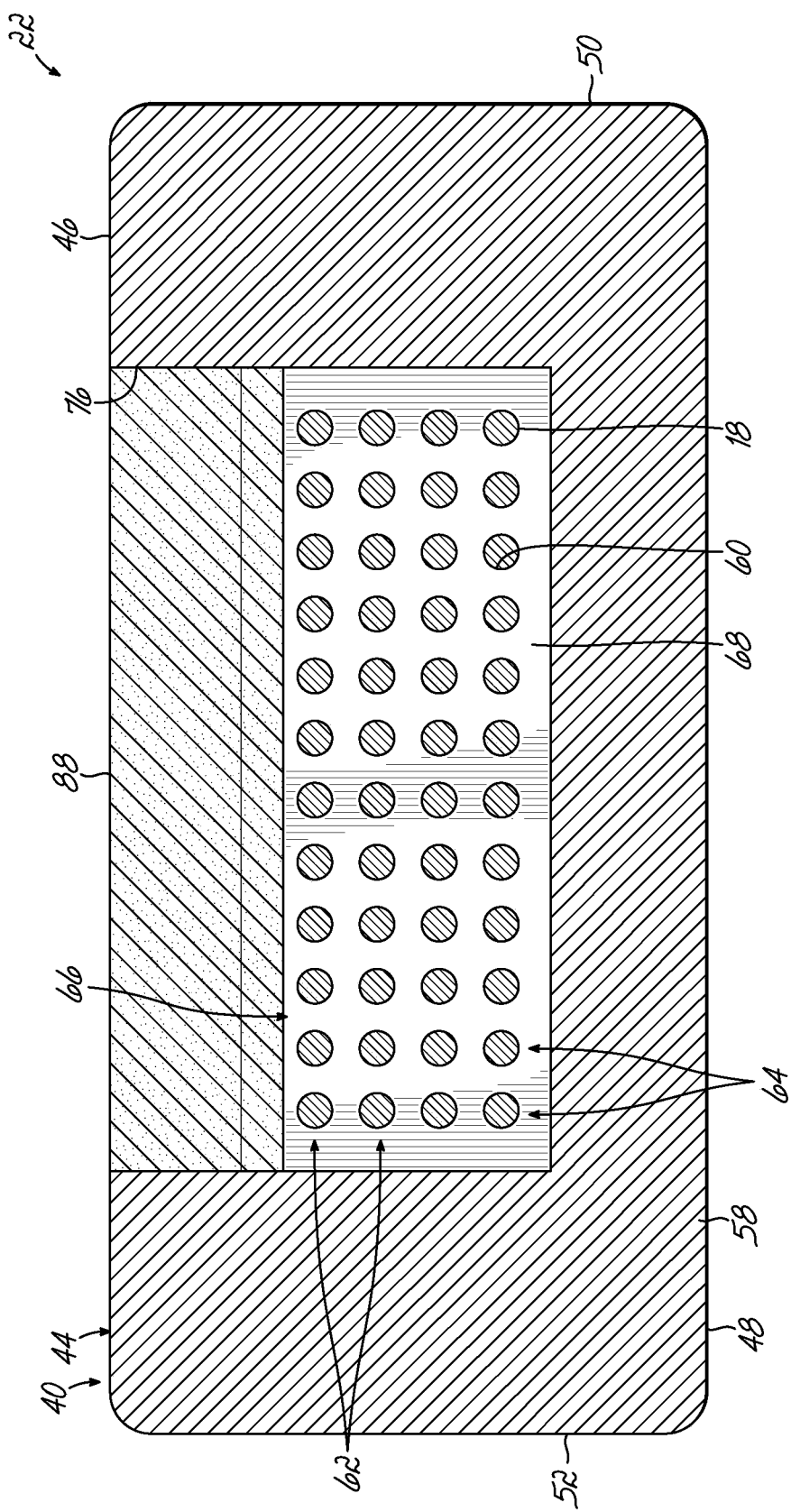
FIG. 4A is a cross-sectional view of the ferrule taken along line 4A-4A illustrated in FIG. 4.

In an exemplary embodiment, and as illustrated in FIG. 4A, the plurality of micro-bores 60 are arranged in a two-dimensional pattern of rows 62 and columns 64 to define a two-dimensional array 66 of micro-bores 60. The number of micro-bores 60 in each row 62 may depend on, for example, how many optical fibers 18 are carried by each ribbon 20. By way of example and without limitation, the number of micro-bores 60 in each row 62 may be between 6 and 36 micro-bores. In an exemplary embodiment, there may be 12 or 16 micro-bores 60 in each row 62. In one embodiment, the number of micro-bores 60 in each row 62 of the array 66 may be the same. In an alternative embodiment, however, the number of micro-bores 60 in each row 62 of the array 66 may differ. By way of further example, the number of rows 62 in the array 66 may be between 2 and 8. In an exemplary embodiment, there may be 4 rows 62 of micro-bores 60 in the array 66. It should be understood, however, that the micro-bores 60 may be formed in the intermediate wall 58 in other numbers and configurations and should not be limited to the particular arrangement described above. For example, aspects of the disclosure may be beneficial for one-dimensional arrays as well.

In one embodiment, the intermediate wall 58 does not have a uniform thickness in the longitudinal direction of the ferrule 22. For example, in an exemplary embodiment, and as illustrated in FIG. 4, the front surface 68 of the intermediate wall 58 may be generally planar but the rear surface 70 may have a stepped configuration defining ledges 72 such that the length of the micro-bores 60 vary for each row 62 in the array 66. Thus, for example, the length of the micro-bores 60 in a top-most row 62 of the array 66 may have a first length and each successive row 62 moving toward the bottom wall 48 may have an increased length. Such a configuration of the rear surface 70 of the intermediate wall 58 aids in securing the optical fibers 18 within the ferrule 22. For example, the top wall 46 of the body 40 may include a first cutout or window 74 through the top wall 46 and open to the first internal cavity 56. The first window 74 allows an epoxy or other suitable adhesive to be injected into the first internal cavity 56 to bond the ribbons 20 or the optical fibers 18 (e.g., if stripped) to the ferrule 22. For example, the ledges 72 may provide an ideal bonding surface to secure the optical fibers 18 within ferrule 22 and within the micro-bores 60 in the intermediate wall 58.

In an exemplary embodiment, and in further reference to FIG. 4, the ferrule 22 further includes a second internal cavity 76 forward of the intermediate wall 58. More particularly, the front surface 68 of the intermediate wall 58 defines a rear of the second internal cavity 76. The ferrule 22, and more particularly the front portion 44 thereof, includes a tip or end wall section 78 defining a rear surface 80 and a front surface 82. The rear surface 80 may be generally planar and define the forward boundary of the second internal cavity 76. As will be explained in more detail below, the rear surface 80 operates as a mechanical stop for the of the optical fibers 18 through the micro-bores 60 of the ferrule 22 such that the end faces 84 (e.g., smooth planar end faces) of the optical fibers 18 abut the smooth rear surface 80 of the end wall section 78 to define an optical stop plane 86. Because the micro-bores 60 receive and position the optical fibers 18, the array 66 results in the optical fibers 18 being positioned in a corresponding array. For convenience, "array 66" may be used in this disclosure to refer to the arrangement of the micro-bores 60 or the arrangement of ends of the optical fibers 18. The latter is also referred to as "fiber optic array 66" in this disclosure to facilitate discussion. The top wall 46 of the body 40 may include a second cutout or window 88 through the top wall 46 and open to the second internal cavity 76. The second window 88 allows epoxy or other suitable adhesive to be injected into the second internal cavity 76 to fix the relative positions of the optical fibers 18 (e.g., the end faces 84 thereof) relative to the rear surface 80 of the end wall section 78 and the optical stop plane 86. For reasons provided below, the adhesive positioned in the second internal cavity 76, however, does not penetrate between the end faces 84 of the optical fibers 18 and the rear surface 80.

In accordance with an aspect of the disclosure, the light beams emanating from the ends 84 of the optical fibers 18 at the optical stop plane 86 are configured to impinge upon an optical element 94 positioned forward of the end wall section 78. Although a single optical element 94 is provided in the embodiment shown, alternative embodiments may include a plurality optical elements 94 (e.g., one corresponding to each optical fiber 18, or several corresponding each to a respective sub-group of the optical fibers 18). The optical element 94 is configured to operate in much the same way as conventional lenses of a lensed connector. More particularly, the optical element 94 is configured to take light beams entering the optical element 94 and produce a corresponding number of enlarged collimated light beams that pass out of the optical element 94. As discussed below in more detail, however, this transformation of the incoming light beams to enlarged collimated light beams is achieved in a different way. In an exemplary embodiment, the front surface 82 of the end wall section 78 may be generally planar and the one or more optical elements 94 may be coupled to the front surface 82. To minimize distortions of the light beams emanating from the ends of the optical fibers 18 at the optical stop plane 86 due to reflective index mismatches or other effects, the end wall section 78, or at least the portion thereof that has light traveling through it in order to reach the one or more optical elements 94, may include a layer of material, such as an adhesive or gel, that substantially matches the refractive index of cores of the optical fibers 18. Refractive indexes that are within 10% of each other are considered to substantially match for the purpose of this disclosure.

As mentioned above, in accordance with an aspect of the disclosure, the optical element 94 may be a holographic optical element, i.e., the optical element 94 may be produced through various holographic imaging techniques. In an exemplary embodiment, the optical element 94 includes a holographic film. For example, the holographic film may include a dichromated gelatin coated onto a substrate, such as a polyester, glass, or fused silica substrate. The holographic optical element 94 is initially unexposed as the fiber optic connector 14, and the ferrule 22 thereof, is being assembled. More particularly, and as explained in more detail below, the exposure or writing of the holographic optical element 94 is performed by the optical fibers 18 after fixing the relative position between the optical fibers 18 and the holographic optical element 94 (i.e., after securing the optical fibers 18 and the optical element 94 to the ferrule 22). This is referred to herein as in-situ holographic exposure. Thus, the optical fibers 18 used to write the holographic optical element 94 are the same optical fibers 18 of the connector 14 during normal use of the fiber optic cable assembly 10. Additionally, the relative position of the holographic optical element 94 and the optical fibers 18 during writing of the holographic optical element 94 is precisely the same as the relative position between the two during use of the connector 14 of the fiber optic cable assembly 10.

The in-situ holographic exposure of the optical element 94 provides a number of advantages to connector 14. For example, perhaps the most significant advantage is that by writing the holographic optical element 94 using the same array 66 of optical fibers 18 as used in the connector 14 and in the same relative position, the optical fibers 18 in the array 66 and the "lenses" written into the holographic optical element 94 will be in precise alignment. In other words, any pitch variations (e.g., in both dimensions) between the micro-bores 60 and ends 84 of the optical fibers 18 in the ferrule 22 are automatically accounted for when writing the "lenses" in the holographic optical element 94. For this reason, the optical fiber array 66 in the ferrule 22 and the "lenses" of the holographic optical element 94 are referred to as being self-aligned. Thus, any losses in the connector 14 (and across an interconnection) due to misalignment errors between the "lenses" of the holographic optical element 94 and the optical fibers 18 is minimized or eliminated altogether. Moreover, the self-alignment feature of the connector 14 obviates the costly and time-consuming process in traditional lensed connectors of aligning the optical fibers and lenses (typically made separately and then incorporated into the connector).

Furthermore, in traditional lensed connectors, the distance between the fiber ends and the lenses may vary and thereby cause loses due to a mismatch in the lens focal length. Similar to the above, however, because the holographic optical element 94 is written using the same array 66 of optical fibers 18 as used in the connector 14 and in the same relative position, the distance between the ends 84 of the optical fibers 18 and the "lenses" of the holographic optical element 94 will precisely match the focal lengths of the "lenses." Thus, any losses in the connector 14 (and across an interconnection) due to focal length errors between the "lenses" of the holographic optical element 94 and the optical fibers 18 is minimized or eliminated altogether.

Figure 5:
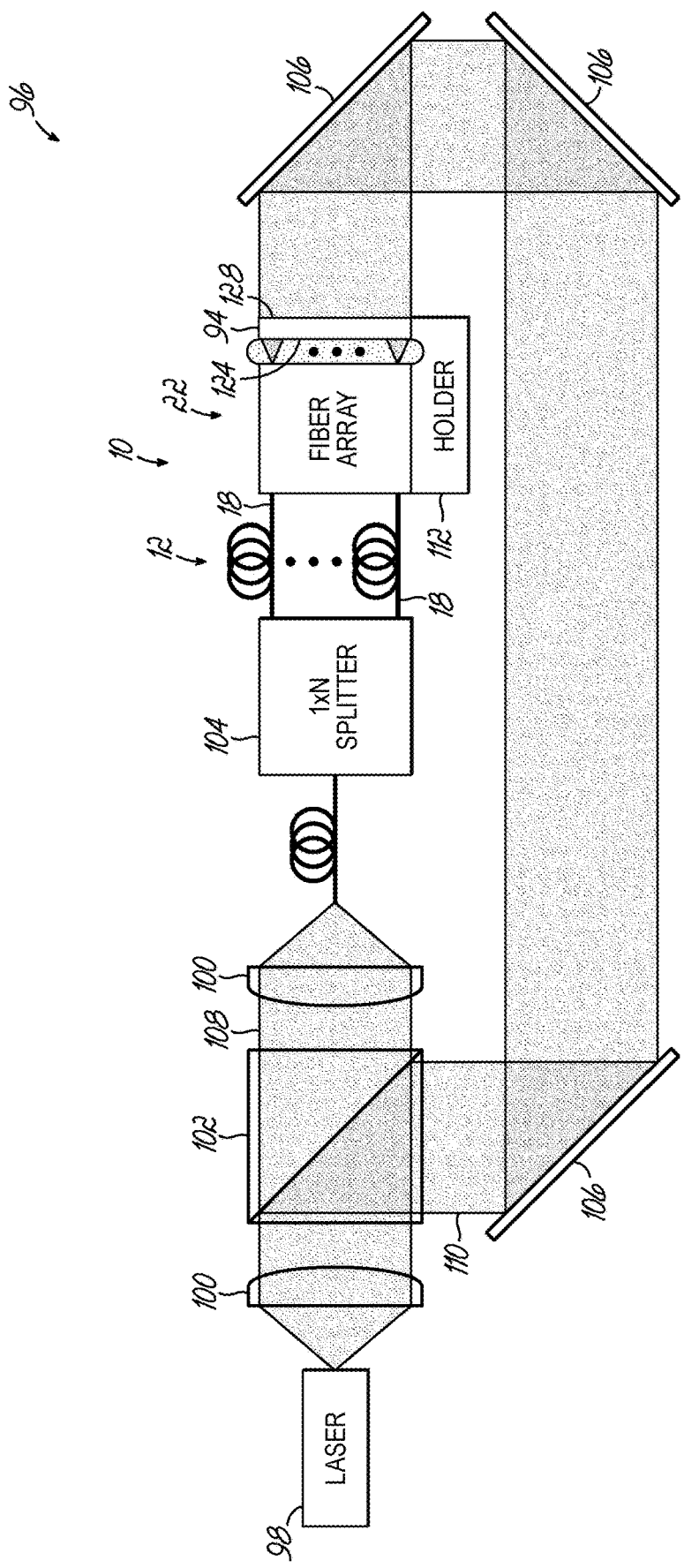
FIG. 5 is a schematic illustration of an apparatus for making a connector in accordance with an embodiment of the disclosure.

FIG. 5 illustrates an exemplary apparatus 96 for making a fiber optic cable assembly 10 having a connector 14 (FIG. 1) with a holographic optical element 94 as described above. FIG. 5 is schematic in nature, and only illustrates the ferrule 22 of the connector 14 to simplify the drawing and description that follows. Although the description will focus on the in-situ holographic exposure mentioned above for one end of the fiber optic cable assembly 10, an opposite end of the fiber optic cable assembly 10 may be terminated with a similar connector 14 and use a similar in-situ holographic exposure technique, as will be discussed below.

As shown in FIG. 5, the apparatus 96 includes a light source such as a laser 98, a pair of collimators 100, a first beam splitter 102, a second beam splitter 104, and an arrangement of mirrors or reflective lenses 106. The laser 98 may be configured to emit a collimated coherent light beam having a wavelength similar to that being transmitted through the optical fibers 18 during use. Thus, for example, the laser 98 may emit light having a wavelength of 850 nanometers (nm), 1310 nm, or 1550 nm. The beam from the laser 98 may optionally be transmitted through a first collimator 100 that expands the beam and ensures that the rays of the laser beam are parallel to each other. The expanded beam is then transmitted to the first beam splitter 102 that splits the laser beam into an object beam 108 and a reference beam 110. The object beam 108 may optionally be transmitted to another collimator 100 that contracts the beam and launches the light into an input optical link for the second beam splitter. For example the beam may be launched directly into an optical fiber that serves as an input of the second beam splitter, or into an optical fiber that is optically coupled (directly or indirectly) with an input optical fiber of the second beam splitter. The second beam splitter 104 splits the incoming optical signal into N output optical signals and, therefore, may be a planar lightwave circuit (PLC) splitter or the like. In an exemplary embodiment, the value of N depends on the number of optical fibers 18 in the ferrule 22 of the connector 14, for example. There may be a 1:1 correspondence, or N may be greater than the number of optical fibers 18. Regardless, the second beam splitter 104 includes a sufficient number of optical outputs to correspond to the number of optical fibers 18.

FIG. 5 does not illustrate the optical outputs of the second beam splitter 104 to simplify the drawings. Persons skilled in optical connectivity, however, will appreciate that the optical outputs may be individual optical fibers or other elements that can be optically coupled (directly or indirectly) to the optical fibers 18 of the fiber optic cable 12 using suitable techniques. For example, this may occur at ends of the optical fibers 18 that are associated with an opposite end of the fiber optic cable 12, and in some cases, prior to or after terminating such ends with an optical connector (e.g., another connector 14). More on this aspect will be discussed below. For the purpose of continuing to describe one specific example, the ends of the optical fiber 18 can be considered as being unterminated (i.e., not connectorized). Regardless, as can be appreciated, the object beam 108 has been split into N object beams, and each of the optical fibers 18 of the fiber optic cable 12 receives a respective one of the N beams.

On the other hand, and still referring to FIG. 5, the reference beam 110 is transmitted through the series of reflective lenses 106. The reflective lenses 106 are arranged such that the reference beam 110 may be projected onto the holographic optical element 94 of the ferrule 22. For this purpose, the apparatus 96 may include a holder 112 for holding at least a portion of the fiber optic cable assembly 10, such as the ferrule 22 or housing 24 (FIG. 1). In any case, the holder 112 is arranged relative to the reflective lenses 106 such that the reference beam 110 projects on the holographic optical element 94 when the cable assembly 10 is being held by the holder 112.

Figure 6:
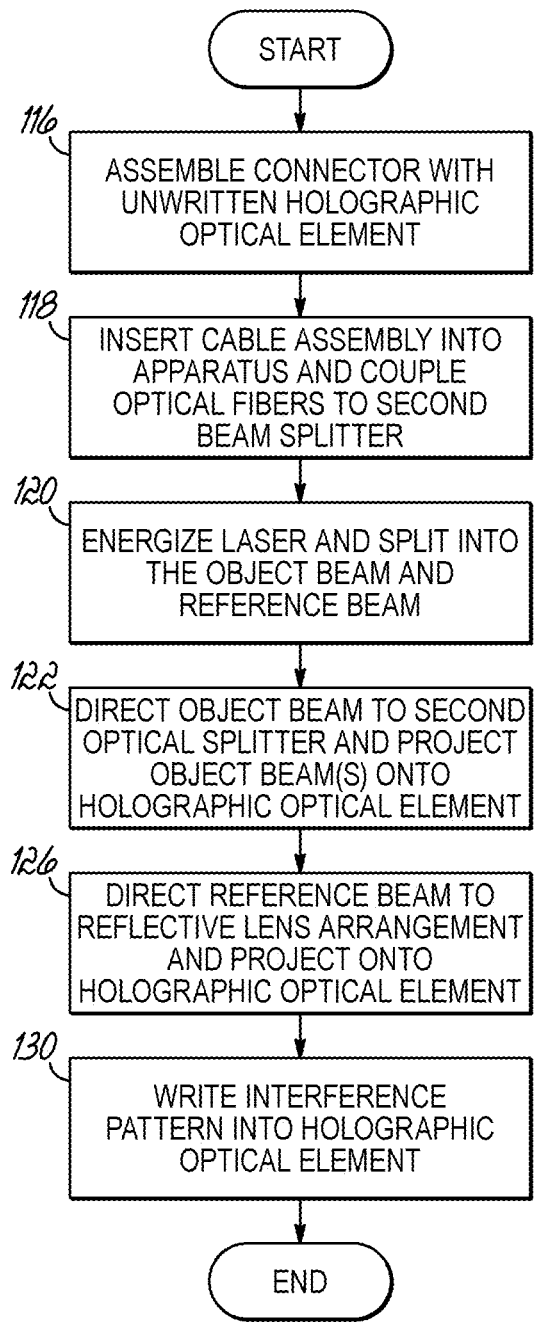
FIG. 6 is a flowchart illustrating an exemplary method for making the connector in accordance with an embodiment of the disclosure.

FIG. 6 is a flowchart of an exemplary method for making the fiber optic cable assembly 10 having connector 14 with a holographic optical element 94 using the apparatus 96. In a first block 116, the connector 14 may be assembled and the holographic optical element 94 of the ferrule 22 is unexposed or unwritten. In this block, the connector 14 may be fully assembled or only partially assembled. For example, at a minimum level of assembly, the optical fibers 18 should be coupled to the ferrule 22 such that the ends 84 of the optical fibers 18 are at the optical stop plane 86 and the optical fibers 18 or ribbons 20 are secured to the ferrule 22, such as with epoxy or other suitable adhesive. This fixes the relative position between the optical fibers 18 and the holographic optical element 94 in the use or operational position of the connector 14.

In a next block 118, the fiber optic cable assembly 10 (or a portion thereof including the ferrule 22) may be inserted into the apparatus 96. For example, the apparatus 96 may include holder 112 for fixing the position of the ferrule 22 in the apparatus 96. As described above and in a subsequent step below, the holder 112 is arranged in the apparatus 96 such that the holographic optical element 94 can be subjected to the reference beam 110 emanating from one of the reflective lenses 106 (e.g., the last reflective lens 106 in a series of lenses) of the apparatus 96. As part of positioning the fiber optic cable assembly 10 in the apparatus 96, the ends of the optical fibers 18 opposite to those terminated by connector 14 may be coupled to the optical outputs (e.g. output optical fibers) of the second beam splitter 104.

With the fiber optic cable assembly 10 inserted into the apparatus 96 and in a subsequent block 120, the laser 98 may be energized to produce a coherent and collimated laser beam in the desired wavelength range that is split at the first beam splitter 102 into the object beam 108 and the reference beam 110. Each of the object beam 108 and the reference beam 110 remain coherent and collimated beams at the wavelength of the laser 98. In a next block 122, the object beam 108 is directed to the second beam splitter 104 such that the object beam 108 is routed to each of the optical outputs of the splitter 104 and into each of the optical fibers 18 of the fiber optic cable assembly 10. The object beam 108 from each of the optical fibers 18 may be projected from the ends 84 of the optical fibers 18 onto the holographic optical element 94, such as onto a rear surface 124 of the holographic optical element 94.

In a further block 126, which occurs in parallel with block 122, the reference beam 110 is directed to the series of reflective lenses 106 of the apparatus 96 such that the reference beam 110 projects onto the holographic optical element 94, such as onto a front surface 128 of the holographic optical element 94. The object beam(s) 108 impinging on the rear surface 124 of the holographic optical element 94 interact with the reference beam 110 impinging on the front surface 128 of the holographic optical element 94 to create a plurality of localized interference patterns in the holographic optical element 94. In a subsequent block 130, these localized interference patterns are permanently imprinted into the holographic optical element 94 and operate as localized "lenses" for the connector 14. After being exposed to the object and reference beams 108, 110 to produce the interference patterns, the holographic optical element 94 may be developed. By way of example, after exposure, the holographic optical element 94 may be subject to a fixing process, a washing process, and a drying process. These processes are generally known to persons of ordinary skill in holography and thus will not be described in further detail herein. Subsequent to developing the holographic optical element 94, a cover (e.g., additional plates) or coating may be applied to preserve and protect the interference patterns in the holographic optical element 94.

In one embodiment, the holographic optical element 94 may be removed from the connector 14 and subject to the fixing, washing, and drying steps. Subsequently, the holographic optical element 94 may be reconnected to the connector 14 in the exact same location as when the holographic optical element 94 was exposed. For example, the connector 14 may include one or more alignment features (not shown) to allow a precise reconnection of the holographic optical element 94 to the connector 14. In an alternative embodiment, however, the entire connector 14 or a portion thereof, such as the ferrule 22, may be subject to the fixing, washing, and drying steps described above without removal of the holographic optical element 94. After the holographic optical element 94 is written and developed, any remaining assembly of the connector 14 or other steps of making the fiber optic cable assembly 10 may be performed. For example, the ferrule 22 may be positioned within the housing 24.

With the termination process complete for only one end of the fiber optic cable 12 (i.e., with the connector 14 fully assembled and the holographic optical element 94 defining its "lenses"), the fiber optic cable assembly 10 is in the form of a "pigtail". The unterminated ends of the optical fibers 18 may be spliced to another pigtail that has been formed in a similar manner. Thus, the fiber optic cable assembly 10 may be considered a "jumper" at that point, with opposite ends each having a connector 14. In alternative embodiments, the unterminated ends of the optical fibers 18 may be spliced a pigtail that includes a different type of connector, or to other optical fibers that are terminated with connectors individually or in pairs such that the fiber optic cable assembly 10 becomes a "breakout" cable assembly. In still further embodiments, the unterminated ends of the optical fibers 18 may be spliced to a corresponding group of optical fibers from a higher fiber count cable that includes a plurality of such groups. This splice may occur at a furcation/fanout of the higher fiber count cable involving splices to multiple pigtails (e.g., each pigtail becoming a "leg" of the cable).

Rather than splicing the unterminated ends of the optical fibers 18, the unterminated ends may be terminated using a process similar to that described above. In other words, another connector 14 with a holographic optical element 94 may be installed on the free ends of the optical fibers 18 using the apparatus 96 and the process described above. Referring back to FIG. 5, the ferrule 22 may represent that of such a second connector 14. The first connector 14 (not shown) would be on the ends of the optical fibers 18 that are optically coupled to the second beam splitter 104. In other words, compared to the example described above involving unterminated ends, the only difference may that the second beam splitter 104 being optically coupled to the optical fibers 18 involves coupling to the first connector 14 that has already been installed. As mentioned above, FIG. 5 is schematic and does not illustrate details of how optical outputs from the second beam splitter 104 are optically coupled (directly or indirectly) to the optical fibers 18, as various coupling techniques will be appreciated by persons skilled in optical connectivity.

Figure 7:
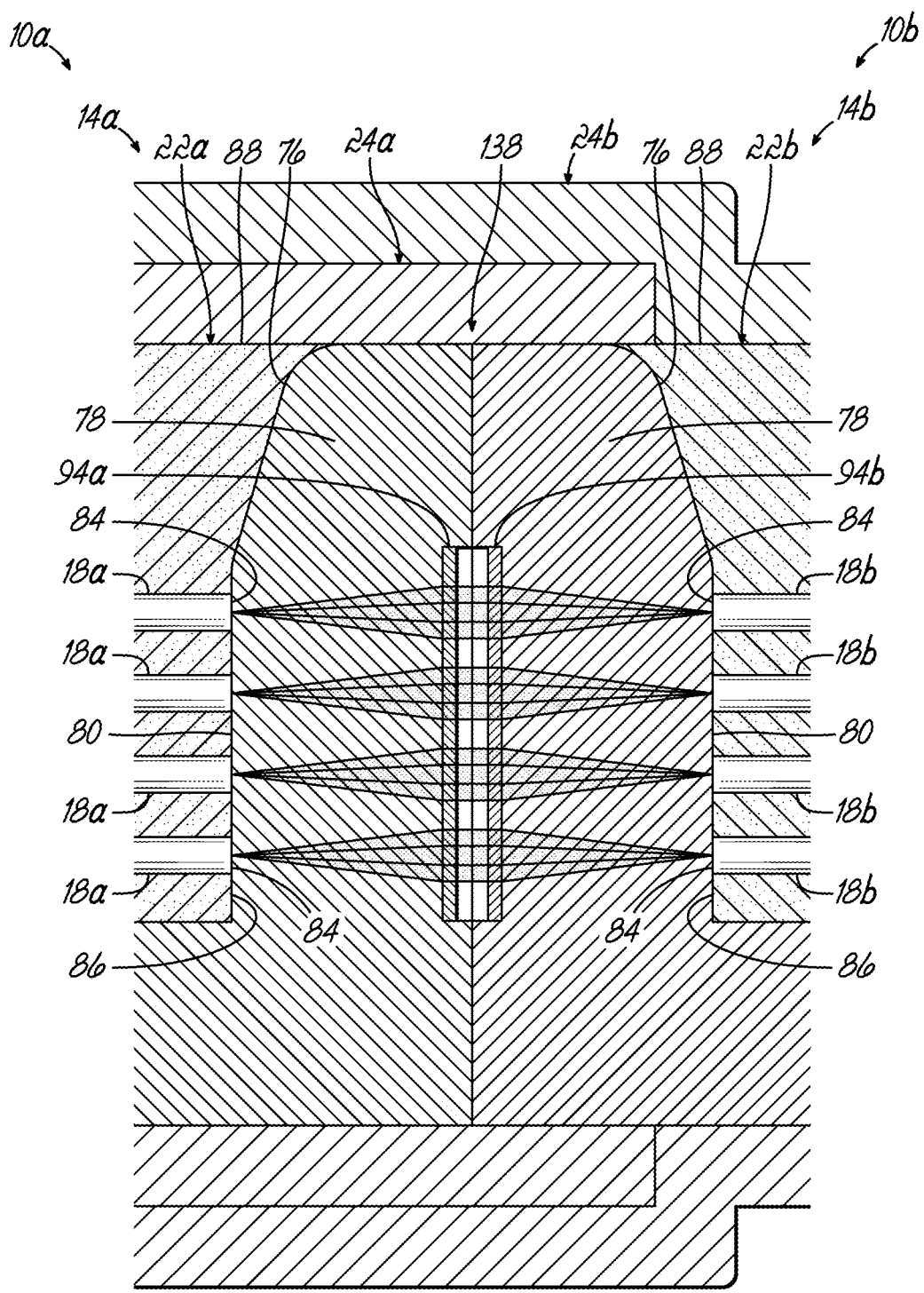
FIG. 7 is a cross-sectional view of an interconnection between two connectors in accordance with an embodiment of the disclosure.

FIG. 7 is a schematic cross-sectional view of an interconnection 138 between two fiber optic connectors 14a, 14b of two cable assemblies 10a, 10b in accordance with the disclosure provided above. Each connector 14a, 14b is similar to that described above but for the housings 24a, 24b being slightly different so that the connectors 14a, 14b may be mated together at the interconnection 138. Each of the ferrules 22a, 22b of the connectors 14a, 14b, however, is configured to be substantially the same and made according to the methods described above. In the interconnection 138 illustrated in FIG. 7, each ferrule 22a, 22b includes four rows 62 in the fiber optic array 66 (see FIG. 4A). Each row 62 of the array 66 may have, for example, twelve microbores 60 and respective optical fibers 18 positioned therein.

Figure 7A:
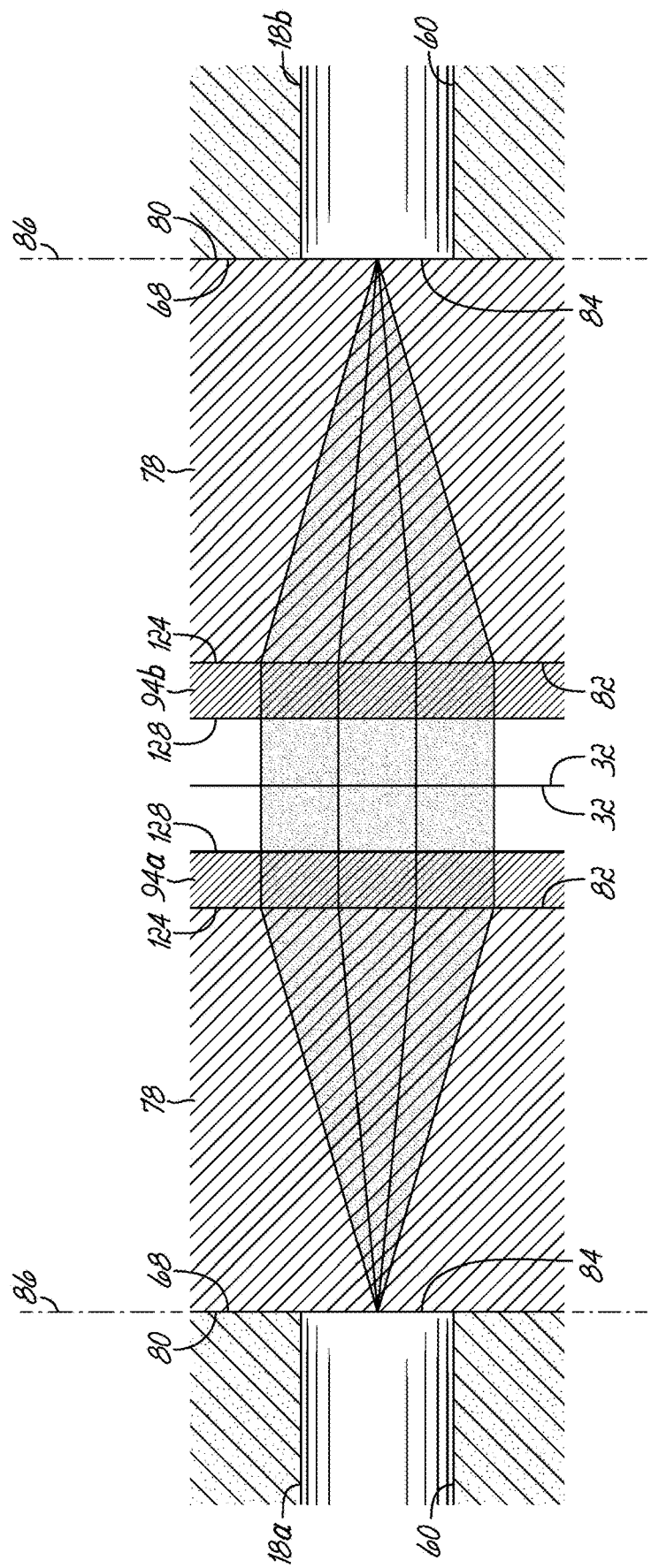
FIG. 7A is an enlarged view of a beam traversing the interconnection illustrated in FIG. 7.

From the perspective of FIG. 7, the left-side fiber optic cable assembly 10a carries the launch optical fibers 18a and the right-side fiber optic cable assembly 10b carries the receptor (receive) optical fibers 18b. As illustrated in FIG. 7A, the optical signal is carried by the launch optical fibers 18a, and more particularly the cores thereof, and end at the optical stop plane 86 of ferrule 22a. The light from the ends 84 of the launch optical fibers 18a is transmitted through the end wall section 78 and expands (i.e., diverges) as the light traverses the end wall section 78 until the light reaches the holographic optical element 94a. By way of example, the light beam from the ends 84 of the launch optical fibers 18a may be configured to expand between about 5 times to about 20 times when traveling from the ends 84 of the optical fibers 18a to the holographic optical element 94a. In an exemplary embodiment, for example, the light beams from the launch optical fibers 18a may expand in diameter from about nine microns (μm) to about 130 μm at the holographic optical element 94a. Other values and ranges may be possible and may be determined, for example, by the distance between the fiber ends 84 and the holographic optical element 94a.

At the holographic optical element 94a, the now expanded light beam from the launch optical fibers 18a interact with the local interference patterns written on the holographic optical element 94a to emit a light beam in accordance to the prior "programming" of the holographic optical element 94. In the instant case, for example, the "output" of the holographic optical element 94a when subjected to light beams from the optical fibers 18a includes a plurality of light beams, with each light beam being collimated, having the same diameter as the light beam that entered the holographic optical element 94a, and all pointing in the same direction. As noted above, because of the manner in which the "lenses" of the holographic optical element 94a are formed, the alignment between the fiber optic array 66 and the interference patterns in the holographic optical element 94a in ferrule 22a is precise and introduces substantially no loses due to alignment errors. Additionally, there are also substantially no loses due to focal length errors between the fiber optic array 66 and the interference patterns in the holographic optical element 94a.

The enlarged, collimated light beams that are emitted from the holographic optical element 94a of the launch connector 14a traverse the space between the holographic optical elements 94a, 94b of the two connectors 14a, 14b of the interconnection 138. Since the connectors 14a, 14b avoid physical contact between the ends of the optical fibers 18a, 18b and the holographic optical elements 94a, 94b are slightly recessed relative to the front 32 of the ferrules 22a, 22b. Because the light beams that travers this space have a larger diameter, compared to the average size of dust and other airborne particles, the interconnection 138 is less susceptible to interruptions and other dust-related losses. Thus, the connectors 14a, 14b may have an improved performance compared to physical-contact connectors. Ultimately, the light beams emitted from the holographic optical element 94a are received by the holographic optical element 94b in the receptor connector 14b, and more particularly in the ferrule 22b of the receptor connector 14b.

Similar to the above, at the holographic optical element 94b, the expanded light beams from the holographic optical element 94a interact with the local interference patterns written on the holographic optical element 94b to emit light beams in accordance to the prior "programming" of the holographic optical element 94b. In the instant case, for example, the "output" of the holographic optical element 94b when subjected to a plurality of collimated light beams includes a plurality of light beams, with each light beam having a converging configuration such that the light beam contracts as the light traverses the end wall section 78. The contracted light beams are received into the ends 84 of the receive optical fibers 18b in the fiber optic array 66 in ferrule 22b and have a size that corresponds to the size of the cores of the receive optical fibers 18b. Because of the manner in which the "lenses" of the holographic optical element 94b are formed, the alignment between the interference patterns in the holographic optical element 94b and the fiber optic array 66 in ferrule 22b is precise and introduces substantially no loses due to alignment errors. Additionally, there are substantially also no loses due to focal length errors between the interference patterns in the holographic optical element 94b and the fiber optic array 66.

Aspects of the present disclosure describe a method of making a "lensed"-style connector for a fiber optic cable assembly. The "lenses" of the fiber optic connector are provided by interference patterns in a holographic optical element, as opposed to traditional lenses. The holographic optical element is formed using in-situ holographic exposure, where the holographic optical element is written using the optical fibers (and in the particular fiber optic array) from the connector once the relative positions between the optical fibers of the connector and the holographic optical element of the connector are fixed. Using in-situ holographic exposure minimizes or eliminates optical losses in the connector and associated interconnections due to certain errors. More particularly, in-situ holographic exposure minimizes or eliminates mechanical alignment errors associated with pitch variations in the optical fiber array and/or the "lens" array. Since the "lenses" (i.e., the local interference patterns) in the holographic optical element are written using the actual fiber optic array of the connector and in the same relative position, the fiber optic array and the "lenses" of the holographic optical element are self-aligned, and thus introduce minimal or no loses due to this potential misalignment. Additionally, in-situ holographic exposure minimizes or eliminates focal length errors associated with variations in the distance between the optical fiber array and the "lens" array. By utilizing aspects of the present disclosure, it may now be possible to provide high fiber count, high density optical connectors that have low losses across an interconnection and are cost effective to manufacture and implement within a fiber optic network.

Those skilled in the art will appreciate that other modifications and variations can be made without departing from the spirit or scope of the present disclosure. Since modifications, combinations, sub-combinations, and variations of the disclosed embodiments incorporating the spirit and substance of the present disclosure may occur to persons skilled in the art, the present disclosure should be construed to include everything within the scope of the appended claims and their equivalents.

What is claimed is:

1. A method of making a fiber optic cable assembly that includes a fiber optic cable and at least one connector, the at least one connector having a ferrule with a holographic optical element, and the fiber optic cable having a plurality of optical fibers, the method comprising:

securing the plurality of optical fibers to the ferrule to fix relative positions of ends of the plurality of optical fibers and the holographic optical element, wherein the ends of the plurality of optical fibers arranged in a fiber array; and with the plurality of optical fibers secured to the ferrule, exposing the holographic optical element to light from the plurality of optical fibers to write an array of interference patterns into the holographic optical element corresponding to the fiber array, wherein exposing further comprises:

energizing a laser to generate a laser beam;

splitting the laser beam into an object beam and a reference beam;

directing the object beam into the plurality of optical fibers of the fiber optic cable such that the light from the ends of the plurality of optical fibers projects onto a first surface of the holographic optical element; and directing the reference beam to project onto a second surface of the holographic optical element, wherein the interaction between the object beam and the reference beam at the holographic optical element creates the array of interference patterns corresponding to the fiber array.

2. The method of claim 1, wherein securing the plurality of optical fibers to the ferrule further comprises:

inserting each of the plurality of optical fibers into a respective micro-bore in the ferrule;

positioning each of the ends of the plurality of optical fibers along a common plane; and securing each of the plurality of optical fibers to the ferrule after said positioning.

3. The method of claim 2, wherein the ferrule includes an end wall section formed from a material that has substantially the same refractive index as cores of the plurality of optical fibers, the method further comprising:

engaging the end of each of the plurality of optical fibers against a first surface of the end wall section to define the common plane; and engaging the holographic optical element against a second surface of the end wall section that is spaced from and opposite to the first surface.

4. The method of claim 2, wherein the plurality of micro-bores in the ferrule are arranged in a two-dimensional pattern.

5. The method of claim 4, wherein the plurality of micro-bores is arranged in a rectangular pattern having between 2 and 8 rows and between 6 and 36 columns.

6. The method of claim 1, further comprising directing the object beam into a beam splitter such that each of the plurality of optical fibers carries the object beam.

7. The method of claim 1, further comprising:
removing the holographic optical element from the ferrule;
developing the holographic optical element; and
reconnecting the holographic optical element to the ferrule.

8. The method of claim 1, wherein the connector further includes a housing, the method further comprising positioning the ferrule within the housing of the connector.

\* \* \* \* \*